Dec. 15, 1964  R. R. COSNER ETAL  3,161,163
AGRICULTURAL TRANSPLANTER FOR USE WITH PLASTIC FILM MULCH
Filed Oct. 2, 1961  2 Sheets-Sheet 1
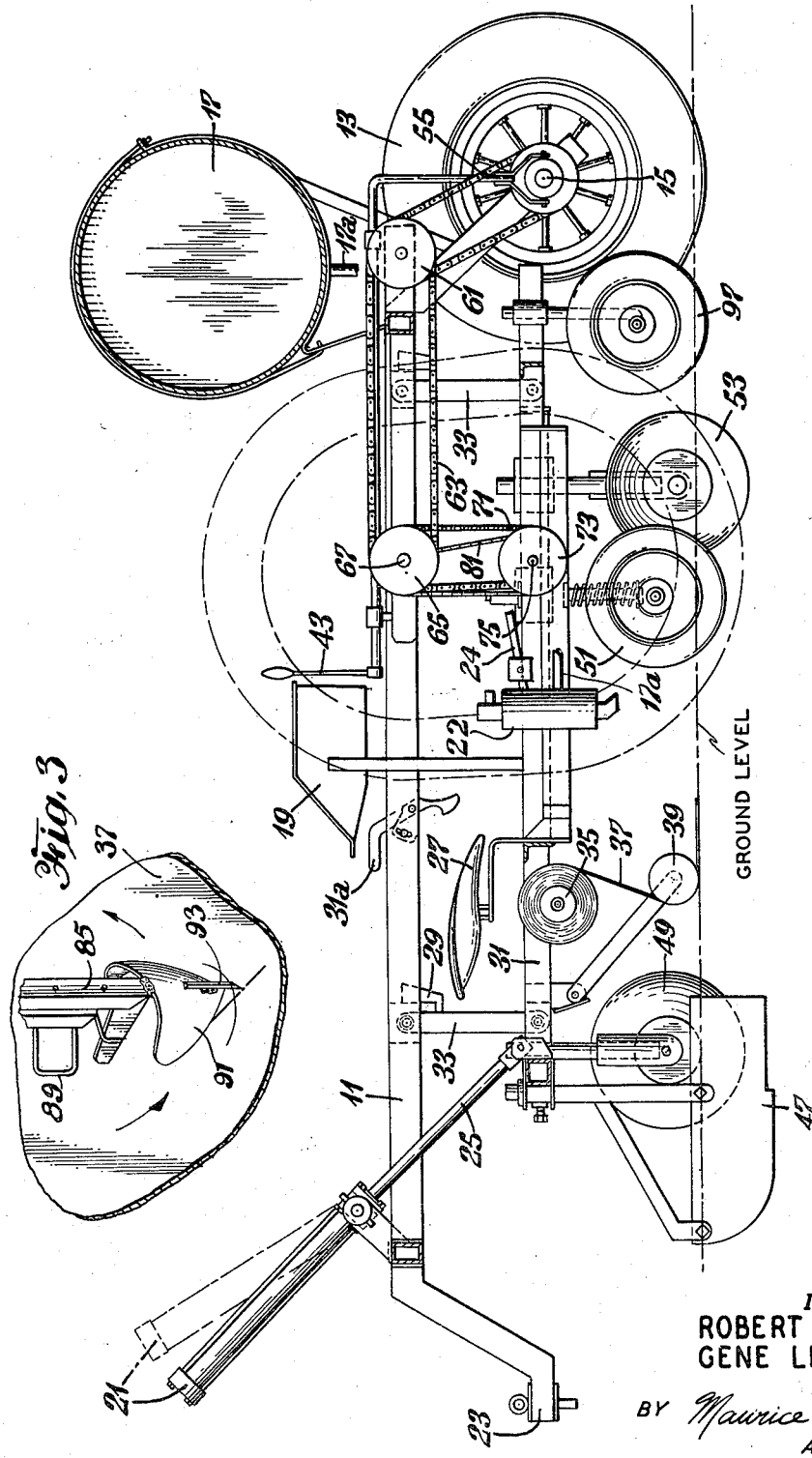
INVENTORS
ROBERT R. COSNER
GENE LEROY
BY Maurice W. Ryan
ATTORNEY

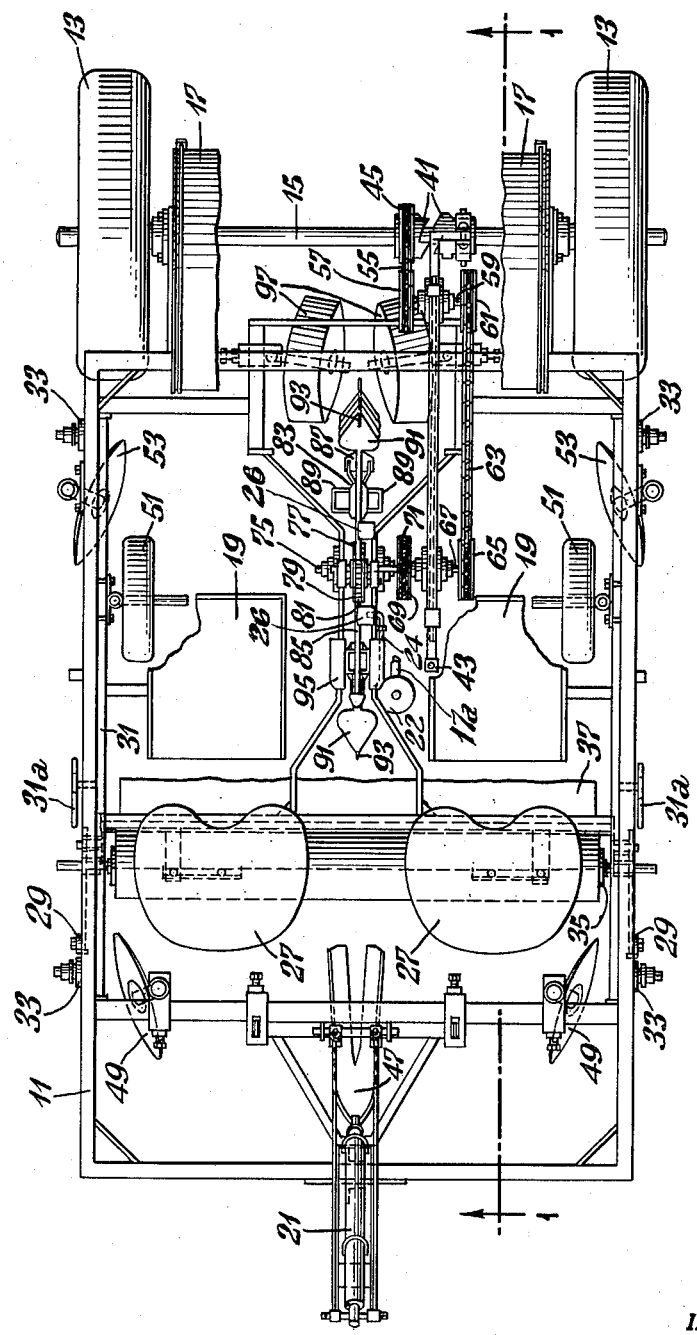

United States Patent Office 3,161,163
Patented Dec. 15, 1964

3,161,163
AGRICULTURAL TRANSPLANTER FOR USE
WITH PLASTIC FILM MULCH
Robert R. Cosner, South Charleston, and Gene Le Roy, Charleston, W. Va., assignors to Union Carbide Corporation, a corporation of New York
Filed Oct. 2, 1961, Ser. No. 142,370
2 Claims. (Cl. 111—3)

The present invention relates to an agricultural transplanter apparatus and more particularly to an apparatus designed to prepare side furrows and a planting aperture in the earth to be planted, place a plastic film mulch on the earth over the furrows and aperture, tamp and secure the mulch in the side furrows, pierce the mulch for insertion of a seedling into the planting aperture, deposit a metered amount of water into the soil at the planting point and tamp the soil around the seedling roots, performing all of the above operations continually during towing by tractor or similar machine in a single crop row traverse.

Persons interested in the agricultural arts have discovered that outstanding benefits can be derived from the use of opaque plastic films as crop mulches. Application of an opaque plastic film to crop soil is known to accomplish conservation of soil moisture, soil nitrogen, and other beneficial constituents of the soil which tend to evaporate under direct sunlight. Seedlings of a desired crop are planted through small openings in the mulch. The opaque mulch prevents propagation of weed plants which quickly die without sunlight. Additionally, as a result of application of opaque film mulch to crop soil there is no need for cultivation during crop growth. The benefits of retained moisture and desirable soil constituents effect higher crop yield and earlier maturity of crops than would be possible otherwise.

While there exists known agricultural apparatus for mechanized laying of plastic film mulch on soil, the most serious obstacle to the realization of full potential of mulch film use has been a lack of equipment suitable for satisfactorily planting seedlings through the film at planting rates reasonably comparable with conventional mechanical planting methods in unmulched ground. Thus, while the advantages accruing in the use of opaque plastic film mulch have been known to persons in the agricultural arts, wide use of the method has not been made due to the necessity, prior to the time of our invention, of hand planting seedings through the applied mulch. The present invention provides an apparatus which solves the above described problem in providing a unique agricultural transplanter comprising, in combination, means to apply an opaque plastic film mulch to soil, means to anchor the mulch, means for opening the soil immediately prior to the mulch application, means for opening the mulch film to permit insertion of a seeding therethrough into the soil, means for depositing the seedling through said opening and releasing it in place in the soil, means for tightly holding the mulch film during the piercing operation to insure a clean opening, means for injecting a metered amount of water into the film opening and soil following the deposit of the seedling to provide initial irrigation and means for compacting the soil around the seedling roots following deposit to provide necessary seedling support for initial plant growth.

With the foregoing and other features in view which shall more fully hereinafter appear, our invention comprises novel constructions, combinations, and arrangements of components as will now be described in detail and as designated in the appended claims and illustrated in the accompanying drawings in which:

FIGURE 1 is an elevational sectional view of the apparatus of the present invention showing the arrangement of the major cooperating components;

FIGURE 2 is a plan view of the apparatus shown in FIGURE 1 with references to the drawings; and FIGURE 3 is an isometric detail view of the blade and backknife portion of the apparatus indicating the cutting action on the mulch.

The apparatus of the present invention comprises two major frames, a stationary frame 11 and a movable frame 31. The stationary frame is borne on two carriage wheels 13 and provides support for movable frame 31 and its related component parts, as well as for a water reservoir 17, a hydraulic lifter assembly 21 arranged to selectively raise and lower the movable frame, and a hitch 23 for towing the device.

Movable frame 31 is suspended from stationary frame 11 by four hangers 33 each having pivotally connected ends attached to the respective frames. A movable piston arm 25 of the hydraulic lifter 21 is pivotally connected to an end of movable frame 31 in a manner to effect raising and lowering of the movable frame for selectively towing or for planting use. With the movable frame in raised position, the apparatus is borne entirely by carriage wheels 13 and the hitch point. A latch 31a is provided on the stationary frame 11 to lock movable frame 31 in the retracted or raised position. Movable frame 31 also supports seedling bins 19 and seats 27 for operators who take seedlings from the seeding bins 19 and place them in the planting mechanism.

An understanding of the present invention may be best achieved by the ensuing description of its operation, with reference to the drawings.

The transplanter is attached to a tractor or other suitable towing device with the movable frame 31 in retracted or raised position and clutch 41 disengaged as shown in FIGURE 2, and towed to a starting position at one end of a row to be planted, bins 19 and reservoir 17 have been initially filled respectively with seedlings to be planted and water for irrigation and spindle 35 having been loaded with a roll of mulch film of suitable size. An initial length of mulch film 37 is reeled off spindle 35, passed under the laying roll 39 and staked or otherwise affixed to the earth under the planter. Hydraulic lifter 21 is actuated to extend or lower movable frame 31 and bring its related components into contact with the soil in the operating position as shown in FIGURE 1. Stops 29 are provided to limit the downward and rearward pivotal movement of movable frame 31 on the hangers 33. Forward and upward movement of the movable frame is not possible during towing due to the force applied to the movable frame by the hydraulic lifter mechanism 21 and soil frictional resistance imposed during towing on the several soil contacting components affixed thereto. Planting operators, two for the embodiment illustrated, then board the machine. Clutch 41 is engaged by a rotational movement of clutch shifter arm 43 to effect rotational movement of idler sprocket 45 with axle 15 of carriage wheels 13. As the transplanter is towed, center furrow opener 47 opens the soil to form a continuous planting aperture and side furrow openers 49 open two parallel side furrows spaced to accommodate the width of mulch film being used. Mulch film 37 reels off spindle 35 and passes under mulch film laying roll 39, which presses the film into intimate contact with the earth. The lateral edges of the mulch film are pressed firmly into the side furrows opened by side furrow openers 49 by a pair of spring-loaded film tamping wheels 51, which also serve to hold the film in a taut condition during the film piercing and planting operation which will be described in detail hereinafter. Side furrow closers 53 close the side furrows over the lateral edges of the mulch film 37, leaving the film edges embedded in soil.

Simultaneously with the above operations, rotational movement of the carriage wheels 13 is transmitted through axle 15, clutch 41, sprocket 45, chain 55, sprocket 57, jack shaft 59, sprocket 61, chain 63, and sprocket 65 to jack shaft 67. Jack shaft 67 transmits movement to sprocket 69, chain 71 and sprocket 73 on a driving shaft 75. A driving sprocket 77 on driving shaft 75 and a follower sprocket 79 support and actuate a pintle chain 81, from which protrudes a multiplicity of plant or seedling holders 83, each comprising an arm 85, a foldable rubber-like plant grip 87, a pair of closing bars 89 to fold the plant holder closed and a spade end 91 to penetrate the mulch film. Each spade end 91 is provided with a back knife 93. A metering valve actuating cam 26, the purpose of which will hereinafter be more fully described, is also provided on each arm 85.

In operation each holder 83 travels up over the top periphery of the follower sprocket 79 on the pintle chain 81 and is presented in a horizontal filling position to the operators on seats 27, who place a seedling from bin 19 in the holder with roots lying in spade end 91. As downward movement of the holder 83 in a horizontal position continues, a pair of closing cams 95 depress the closing bars 89, folding the plant grip 87 securely on the seedling to prevent premature drop out. As the holder 83 moves around the lower periphery of driving sprocket 77 and begins to assume a vertical position, back knife 93 cuts a longitudinal slit in the plastic film mulch. With further travel, spade end 91 cuts a transverse slit in the mulch and enters the planting aperture formed by center furrow opener 47. During the film piercing operation, film tamping wheels 51 are impinging on the film lateral edges and hold the film taut to facilitate slitting and piercing and to prevent pushing the film down into the planting aperture. At the extreme bottom of travel, when the holder 83 has assumed a vertical position, the closing bars 89 disengage from closing cams 95 and resilient plant grip 87 opens or unfolds, due to its inherent resiliency, depositing the seedling it held in an upright position with roots in the planting aperture. As travel continues and the holder assembly begins to leave the vertical position, back knife 93 slits the film further to provide relief during the spade end exit and to prevent dragging the seedling from its deposit point. The net result of this combined operation is a pair of intersecting slits normal to each other which provide four supporting points against the seedling stem.

Simultaneously with the withdrawal of the plant holder from its depositing position, initial irrigation water is injected through the film opening by means of a metering valve 22 supplied from reservoir 17 through a conduit 17a. The valve outlet is provided with an operating lever 24 which is actuated by a metering valve actuating cam 26 on a plant holder. In the embodiment illustrated in the drawings the metering valve 22 is mounted on movable frame 31 adjacent one of the plant holder closing cams 95 and its operating lever 24 is disposed so as to be actuated by a cam 26 on the next occurring plant holder arm as said arm travels downward towards the depositing position. In other words, the action to effect initial irrigation on a particular deposited plant is performed by the cam 26 on the next occurring plant holder in the progression.

Compacting the soil around the roots of the deposited seedlings is effected by a pair of compacting wheels 97 suspended from the rear portion of movable frame 31. These compacting wheels are arranged to impinge on the film with sufficient force to close the planting aperture against the seedling roots.

In the embodiment described above and illustrated in the drawings, center furrow opener 47 is generally similar to a plow share and the side furrow openers 49 and closers 53 are generally similar to harrow discs. Those familiar with the art will recognize that other means may be adapted to perform the functions of these components. Similarly, alternative components may suggest themselves with respect to the film tamping wheels 51, the soil compacting wheels 97 and any of the other several above described components of our invention. Since numerous modifications could be made in the apparatus here disclosed and many apparently different embodiments of our invention can be made without departing from the scope thereof, it is intended that all matter contained in the description and illustrated in the accompanying drawings shall be interpreted as being illustrative and not in a limiting sense.

What is claimed is:

1. An agricultural seedling transplanter comprising, in combination, a wheel-supported first frame adapted for towing; a selectably retractable and extendable second frame suspended from said first frame; means to selectably extend said second frame into an operating position and retract said second frame from said operating position; furrow opener means mounted on said second frame and adapted to open a longitudinal planting aperture in soil to be planted; further furrow opener means mounted on said second frame and disposed to open a pair of side furrows parallel to said planting aperture, each furrow of said pair of side furrows being spaced approximately equidistant from said planting aperture; roller means suspended from said second frame and arranged to apply an elongate plastic film mulch, having substantially parallel lateral edges, longitudinally on the soil over the side furrows and the planting aperture; tamping wheel means suspended from said second frame and disposed to impress the lateral edges of said plastic film mulch into said side furrows; side furrow closing means suspended from said second frame and arranged to close the side furrows over the lateral edges of the plastic film mulch; means mounted partly on said first frame and partly on said second frame for periodically opening the film mulch at spaced intervals above the planting aperture and concurrently depositing a seedling into each opening and releasing the seedling in place in the planting aperture during a time when the lateral edges of the plastic film mulch adjacent to each film mulch opening are being impressed into the side furrows; valve means mounted on said second frame and adapted to deposit a metered quantity of water into each film opening and soil thereunder following each seedling deposit; and wheel means suspended from said second frame and disposed to compact the soil around seedling roots following seedling and water deposit.

2. Apparatus according to claim 1 in which said means for periodically piercing the film mulch, depositing a seedling into each opening and releasing the seedling in the planting aperture comprises, in combination, a multiplicity of seedling plant holding arms arranged equidistantly along and projecting outwardly from an endless chain arranged to move orbitally on two sprockets, said sprockets being arranged one each respectively on said first frame and on said second frame; a spade end on each of said holding arms; and a backknife on each spade end.

(References on following page)

References Cited in the file of this patent

UNITED STATES PATENTS

| | | |
|---|---|---|
| 1,787,902 | Herfort | Jan. 6, 1931 |
| 1,802,273 | Richards | Apr. 21, 1931 |
| 2,003,390 | Poll | June 4, 1935 |
| 2,518,570 | Renault | Aug. 15, 1950 |
| 2,625,122 | Carelock | Jan. 13, 1953 |
| 2,626,578 | Morine | Jan. 27, 1953 |
| 2,708,812 | Nakai | May 24, 1955 |
| 2,740,233 | Reynolds | Apr. 3, 1956 |
| 2,890,665 | Kang | June 16, 1959 |
| 3,002,473 | Morine | Oct. 3, 1961 |
| 3,005,425 | Saifaku | Oct. 24, 1961 |

OTHER REFERENCES

Texas Agricultural Process, vol. 7, No. 4, July-Aug. 1961 (pages 9 and 10 relied on).